(12) United States Patent
Häffelin et al.

(10) Patent No.: US 9,770,874 B2
(45) Date of Patent: Sep. 26, 2017

(54) METHOD FOR PRODUCING A COMPONENT FROM A FIBRE COMPOSITE, PREFORM THEREFOR, AND COMPONENT

(75) Inventors: Daniel Häffelin, Munich (DE); Swen Zaremba, Munich (DE)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 238 days.

(21) Appl. No.: 13/806,279

(22) PCT Filed: Jul. 13, 2011

(86) PCT No.: PCT/EP2011/003497
§ 371 (c)(1),
(2), (4) Date: Mar. 4, 2013

(87) PCT Pub. No.: WO2012/007160
PCT Pub. Date: Jan. 19, 2012

(65) Prior Publication Data
US 2013/0157057 A1    Jun. 20, 2013

(30) Foreign Application Priority Data

Jul. 14, 2010   (DE) .................. 10 2010 027 159
Jul. 21, 2010   (DE) .................. 10 2010 031 886

(51) Int. Cl.
*B29C 70/68*    (2006.01)
*B29C 70/48*    (2006.01)
(Continued)

(52) U.S. Cl.
CPC ............ *B29C 70/68* (2013.01); *B29C 70/086* (2013.01); *B29C 70/48* (2013.01); *B29C 70/542* (2013.01);
(Continued)

(58) Field of Classification Search
CPC ..... B29C 70/48; B29C 70/086; B29C 70/542; B29C 33/0016; B29C 44/182
See application file for complete search history.

(56) References Cited

U.S. PATENT DOCUMENTS 3,549,477 A * 12/1970 Burgman ...................... 428/335
5,151,277 A *  9/1992 Bernardon ............ B29C 33/302
                                                    249/155
(Continued)

FOREIGN PATENT DOCUMENTS

DE      103 09 811 A1    10/2003
DE   102004029174 A1     1/2006
(Continued)

OTHER PUBLICATIONS

International Search Report and Written Opinion for International Application No. PCT/EP2011/003497 dated Mar. 5, 2012.
(Continued)

*Primary Examiner* — Matthew Daniels
(74) *Attorney, Agent, or Firm* — Mendelsohn Dunleavy, P.C.; Steve Mendelsohn

(57) ABSTRACT

A method for producing a component from a fiber composite. A number of layers of a dry fibrous material are stacked to form a pile, the pile is covered by a thermoplastic film in a gas-tight manner, the inner space occupied by the pile within the film is pumped dry and the layers are fixed to form a preform that is stable during transport, the preform is reshaped, a liquid thermosetting material is inserted into the inner space by infiltration of the fibrous material, and the preform is hardened with the infiltrated fibrous material to form the finished component, the film binding permanently as the surface. The invention also relates to a component produced in such a way, and to a corresponding preform. The production method provides a process-integrated sur-
(Continued)

face finishing of the fiber composite. The surface properties are created by the bound thermoplastic film.

19 Claims, 2 Drawing Sheets

(51) Int. Cl.
 *B29C 70/08* (2006.01)
 *B29C 70/54* (2006.01)
(52) U.S. Cl.
 CPC .. *Y10T 428/3154* (2015.04); *Y10T 428/31507* (2015.04); *Y10T 428/31938* (2015.04)

(56) References Cited

U.S. PATENT DOCUMENTS

| | | | |
|---|---|---|---|
| 5,217,766 A * | 6/1993 | Flonc | B29B 11/16 156/222 |
| 5,298,098 A * | 3/1994 | Hoedl | 156/73.1 |
| 5,322,665 A | 6/1994 | Bernardon et al. | |
| 6,254,712 B1 * | 7/2001 | Enlow et al. | 156/244.11 |
| 8,057,622 B2 | 11/2011 | Wagner et al. | |
| 2004/0145095 A1 * | 7/2004 | McCollum et al. | 264/544 |
| 2005/0081691 A1 * | 4/2005 | Shteyngarts | 83/171 |
| 2007/0278718 A1 * | 12/2007 | Okoli et al. | 264/299 |
| 2011/0014315 A1 * | 1/2011 | Okoli | B29C 70/086 425/405.1 |

FOREIGN PATENT DOCUMENTS

| | | |
|---|---|---|
| EP | 0 549 110 A1 | 6/1993 |
| EP | 1 160 067 A2 | 12/2001 |
| GB | 1230710 A | 5/1971 |
| JP | H10249940 A | 9/1998 |
| JP | 2008540196 A | 11/2008 |
| WO | WO 94/14601 | 7/1994 |
| WO | WO2009112017 A2 | 9/2009 |

OTHER PUBLICATIONS

English Translation of the International Search Report and Written Opinion for International Application No. PCT/EP2011/003497 dated Jan. 15, 2013.

* cited by examiner

METHOD FOR PRODUCING A COMPONENT FROM A FIBRE COMPOSITE, PREFORM THEREFOR, AND COMPONENT

FIELD

The invention relates to a process for producing a component made of a fiber composite material, where a fiber material is saturated with a thermoset and is hardened to give the finished component. The invention further relates to a preform made of the fiber material and utilized for producing the component. The invention likewise relates to a component correspondingly produced. The invention is very substantially concerned with the topic of broadening the range of applications of fiber composite materials.

BACKGROUND

Fiber composite materials are produced by a time-consuming and expensive process. The fiber composite material is composed of a proportion of fibers and a proportion of matrix, and the material here is produced during processing. It is by way of example usual, before matrix and fibers are combined, for example by infusion or injection, to produce a dry preform made of fibers and approximating to the final shape of the component. The production of a preform is achieved inter alia by mutually superposing layers of flat semifinished fiber products which, by using pressure and heat, can be pressed into a shape which is similar to the final geometry. The matrix, and with this the prefabricated component, is then hardened.

A matrix material that can be used is thermosets, which can be composed of a plurality of components. Typical examples are epoxy, vinyl, polyester, and phenolic resin systems. These exhibit a curing reaction, which takes place at room temperature or at higher temperatures.

This process has shortcomings in the efficiency of the resources used and the sequence of steps in the process, since individual steps are required in the process for each of the following: preforming, applying release agent to the injection mold, the injection/infiltration process, subsequent downstream operations on the surface, and cleaning of the mold; the process described below links these in order to improve efficiency of resource use.

The production process for fiber composite components gives them a characteristic surface structure which has hitherto restricted their range of applications. The fiber structure here is visible under the surface, because of anisotropy in the direction of the thickness. Production of a smooth surface, required by way of example in the vehicle industry or airline industry, in products intended for everyday use, etc., requires complicated and expensive downstream operations on fiber composite components. By way of example, this requires repeated lacquering of the surface of a fiber composite component, with intermediate curing and smoothing processes. As an alternative, a film can be applied subsequently to a fiber composite component, and to this end by way of example a spray process is used to apply various layers which react chemically and thus form a film. Another possibility for applying films is a thermal or mechanical deep-draw process, where two-dimensional films are heated, and/or are stretched to give the intended geometry, with the reduction of wall thickness.

Because of the enormous weight reduction that can be achieved with fiber composite materials, the automobile industry in particular is also willing to accept expensive measures for providing a high-quality surface, for example integration of intermediate layers, use of comparatively expensive resins with low shrinkage, or use of high-quality semifinished fiber products.

The cost for providing a high-quality surface on fiber composite components here can make up more than 50% of the total costs of the component.

In order to improve the production process, and in order to provide a high-quality surface on a fiber composite component, EP 1 724 098 A1 discloses a process which begins with preforming of a separate layer of material corresponding to the desired fiber shape, applies fiber material to said preformed layer of material, uses a resin to harden the fiber material, and thus forms the final product. The additional layer of material here becomes bonded with the fiber material and in particular forms a desired surface on one side. The preformed additional layer of material can also be transported in the form of preform with the applied fiber material for final processing. The preformed layer of material here serves to some extent as female mold. The component mold itself can be reutilized, and no cleaning is required here to remove resin that has been used. For the additional layer of material, preference is given to the use of plastics films made of PET (polyethylene terephthalate), PC (polycarbonate), PA (polyamide), PMMA (polymethyl methacrylate), PBT (polybutylene terephthalate), PUR (polyurethane), or else acrylic films, or a mixture of the above materials.

DE 103 09 811 A1 discloses a similar process where a mold having the topography of the surface of the finished component is used to produce a plastics film molded in accordance with the final shape of the desired component. A fiber-reinforced plastic is applied to that side of the preformed film which is not the surface of the finished component. The finished component is removed after hardening of the fiber-reinforced plastic.

The same process for producing a fiber composite material provided with a high-quality surface can also be found in DE 10 2008 009 438 A1. The process used for this purpose heats a cut-to-size surface film up to the softening point and molds the same in a mold in accordance with the topography of the molding to be produced. A woven fiber fabric and a polymer resin are applied to the internal side of the preformed surface film, and are molded in accordance with the topography of the molding, and hardened. The finished component is removed from the mold after the hardening process.

A disadvantage of said processes is that separate preforming of the subsequent surface is necessary as an additional operation. Furthermore, the processes provided can provide a high-quality surface only on one side.

In connection with an alternate production process for a fiber composite material, DE 20 2005 005 475 U1 discloses utilization of a profiled preform of sandwich structure. The preform here comprises a stack made of core sublayers and of film sublayers. In the interior there is an unreacted fiber-material-resin layer optionally on a stiffening core. The arrangement moreover has an outer film layer, a nonwoven layer and, for sealing with respect to the environment, a durably elastic film layer. The preform is intended to behave like a film, and it can therefore be shaped by means of a deep-draw system for films, and hardened.

A disadvantage is that the sandwich-structure preform is difficult to transport, because of inadequate mechanical stability. Another possibility moreover is that the resin introduced hardens undesirably during transport.

DE 100 27 129 C1 also discloses a preform for producing a component made of a fiber composite material. The preform here is composed of fiber material which also takes the form of sublayers and which can already have a three-dimensional shape. A sheathing means encloses the fiber material, and is composed of an elastic plastics material. The sheathing means provided has the shape of, for example, a tube or cushion. The previous use of release agent between insert parts and mold can be omitted because the sheathing means has been provided. The sheathing means prevents contact between the mold and the resin. In order to form the finished component, the resin is introduced, in particular by suction, into the interior of the sheathing means, whereupon the fiber material is saturated.

The elastic sheathing means disadvantageously causes undesired prestressing, which can hinder shaping of the component. Although no release agent is required for the mold, a complicated procedure is required to remove the sheathing means from the finished component.

SUMMARY

In one embodiment, the invention provides a simplified production process for a component provided with a high-quality surface and made of a fiber composite material. Another embodiment provides a preform for a production process of this type. Another embodiment of the invention provides a fiber composite component that is easy to produce, provided with a high-quality surface.

The first-mentioned embodiment is achieved through a process for producing a component made of a fiber composite material where a number of sublayers of a dry fiber material are stacked to give a stack, a thermoplastic film is used for gastight sheathing of the dry stack, the internal space occupied by the stack within the film is subjected to suction from a pump, the sublayers being secured to give a preform that is stable during transport, a liquid thermoset is introduced into the internal space, with saturation of the fiber material, the preform is subjected to a forming process, and the preform with saturated fiber material is hardened to give the finished component, with durable bonding of the film as surface to the system.

It is not essential here that the individual production steps proceed in the stated sequence. Rather, rational variations of the sequence are also possible. In particular, the forming process to which the preform is subjected can be undertaken prior to, during, or after the saturation of the fiber material.

Embodiments of the invention start from the idea of finding an integrated-process approach to providing high surface quality to a fiber composite component. The additional process steps necessary hitherto lead to increased use of resources, to increased cycle time, to additional tie-up of capital and plant, and also to reduced competitiveness of the fiber composite components in relation to existing metallic solutions. These disadvantages can be avoided by using an integrated-process approach.

Instead of, as hitherto usual, rendering the fiber material, for example in the form of what is known as a prepreg, easier to handle by saturating or securing the individual fiber sublayers with the subsequent binder material, the mutual superposition of the fiber material now takes place while this material is dry. A thermoplastic film is used to sheath the dry stack. The internal space between the films is then subjected to suction from a pump, or evacuated.

This gives a preform which has protection from external influences, such as dust and moisture, and which, unlike a preform that does not use a film, has relatively high intrinsic stiffness and can therefore by way of example be subjected to automated positioning. The dry welded-in preform is resistant to aging and can therefore also be transported over relatively long distances. There is no risk of any undesired hardening, since no binder material has been used to stabilize the shape of the fiber material or for prefabrication of a preform in the form of a sandwich structure.

The stability of the preform during transport is achieved in that the internal space has been subjected to suction from a pump and in that the exterior thermoplastic film is in contact with the stack by virtue of the pressure difference provided. The invention does not therefore per se require any securing of the individual sublayers. In a preferred embodiment, the individual sublayers of the dry fiber material are therefore stacked in unsecured form, thus giving a stack that is unsecured and dry. The thermoplastic film is used to sheath said stack in a gastight manner. The internal space is subjected to suction from a pump.

In an advantageous embodiment, the sublayers of dry fiber material are stacked to give a drapable stack. The individual sublayers here can be secured to one another locally or sectionally—if necessary—but the dry stack can still be subjected to a forming process to give the desired final geometry of the finished component without any corrugation or creasing due to the securing process. In other words, said securing process must continue to allow displacement that is necessary for drapability in relation to the geometry of the component, slip or shear of the fibers within the fiber material. The drapability here results from the position of the securing locations. The securing process can be achieved through local sewing, local adhesive bonding, local needling, or local stapling, or through the presence of a local intermediate sublayer of a double-sided adhesive material. It will be seen that a securing process which involves a substantial area, rather than being local, restricts drapability. A securing process that involves a large area, for example by adhesive bonding and hardening, hinders the mutual slip or mutual shear of the fibers of the fiber material.

A drapable dry stack secured locally in appropriate manner to this extent can also be designated here as a stack which is in essence unsecured. A stack of this type differs in particular from a known prepreg in that the stack is dry. The individual sublayers of the drapable stack have optionally been secured, but do not adhere to one another over a large area by virtue of saturation with resin. The dry stack per se has the necessary drapability. The stability during transport is not achieved through resin saturation, but instead through the sheathing film, which is in close contact with the dry stack after the internal space has been subjected to suction from a pump.

Because the preform is stable during transport, the logistic advantages of a decentralized press process can be utilized fully, through reduced lay-up times in the press cavity. It is possible to delay introduction of the liquid thermoset into the internal space between the films, with saturation of the fiber material, until a juncture immediately prior to or during the final shaping process. The subatmospheric pressure in the internal space here can be used advantageously for the desired uniform saturation of the fiber material.

Aside from these advantages, however, an embodiment of the invention now additionally acknowledges, in a final step, that the formation of a dry preform that is stable during transport can be further supplemented to provide high surface quality in an integrated process. To this end, the dry stack made of fiber material is sheathed by using a thermoplastic film which, during the hardening of the thermoset introduced, becomes durably bonded in the form of surface to the system. This step is based on the discovery that the hardening process can be utilized without difficulty in such a way that the films stabilized in the preform become durably bonded to the system.

Because a thermoplastic film is used, there is no longer any need for the previous separate preforming of an additional layer of material that subsequently optionally acts as surface. Instead, the thermoplastic film is integrated into the previous production process. In the forming process for the preform, the thermoplastic film is adapted by way of example with exposure to heat to the desired topography of the finished component. This is achieved by way of example without any additional process step as was previously the case in the shaping of the composite component in the mold cavity.

The hardening process gives a component made of a fiber composite material, the principal surface properties of which are determined by the film, and which requires only a small amount of downstream work. When the surface properties are principally determined by a film, modularizability is increased. When firms have little manufacturing capability, or when there is a plurality of suppliers, color differences and surface differences can occur in the final product, but this situation is reliably avoided when one central film producer is utilized as provider for the film. The process parameters for the surface material have been separated from the parameters for producing the structure. A film can be manufactured in dedicated processes, thus permitting comparatively low-cost production of a wide variety of materials with different properties. It is also possible to bond a plurality of such materials with desired properties in layers to give a compound film.

An embodiment of the invention permits achievement of desired surface properties of composite material components through adaptation of a film production process, while on the other hand there is no need for complicated additional process steps supplementing the production process for the fiber composite component. Instead, the subsequent surface of the fiber composite component is simultaneously utilized in the preliminary process for producing a preform that is stable during transport, and this in turn provides additional advantages in respect of the creation of the more advantageous production process. The exterior film becomes durably bonded here in the form of surface to the component.

It is also possible to omit the use of a release agent to achieve separation between resin and mold during the process for forming of the preform. This effect is already achieved by virtue of the thermoplastic film sheathing the dry fiber stack.

When the forming process for the preform is undertaken prior to the saturation of the fiber material, the temperature for the forming process for the film can be selected specifically, independently of the hardening temperature for the thermoset. This then also prevents any possible problematic hardening of the thermoset during the forming process.

A pressure difference is preferably used to introduce the liquid thermoset. This can by way of example be achieved by infiltration, where a subatmospheric pressure is applied to the preform in such a way that the still liquid thermoset, in the form of binder material, is sucked into the internal space within the film. Uniform saturation of the hitherto dry stack of fiber material is achieved. On the other hand, the saturation can also be achieved through an injection process, where the liquid thermoset, itself under pressure, is introduced into the internal space within the film. In the case of either of these possibilities, a useful method of introduction utilizes the subatmospheric pressure prevailing in the internal space of the preform.

The durable bonding between the system and the exterior film that provides a gastight seal is achieved through adhesion, during hardening of the preform. Said adhesion results inter alia from mechanical anchoring, where pores and depressions in the film are penetrated by the liquid thermoset during the saturation process and, in the hardened, solid state, form undercuts. On the other hand, as a function of the thermoset used and of the thermoplastic film used it is also possible, during the production process, that what is known as autoadhesion takes place, where the hydrocarbon chains of the polymers used are in contact with one another or penetrate through one another, in such a way that the two materials are finally held by intermolecular forces. Other phenomena that can likewise lead to specific adhesion in the finished component are electrostatic interactions, Van der Waals forces, dipole interactions, and the like. For the purposes of an embodiment of the invention, all of these adhesion effects, some of which are not clearly separable, can be utilized to give durable and inseparable bonding of the film during the hardening process. An embodiment of the invention therefore excludes those pairings of material between the thermoplastic film and the thermoset which are easily separable from one another after the hardening process. This is by way of example the case with plastics when these differ in respect of their polarity, or chemically, to an extent that by way of example no mutual wetting or interpenetration can take place in the liquid phase. These pairings of material are by way of example conventional for designing a film covering that is readily peelable.

In an advantageous embodiment, an adhesion promoter is used to promote coherent bonding of the film to the system. An adhesion promoter of this type can by way of example be part of the internal side of the thermoplastic film, where adhesion promoter and thermoplastic film have in particular already been produced as film composite comprising both. The selection of the adhesion promoter is then such that, for example, by virtue of heating it mixes in the form of liquid phase with the thermoset or penetrates into the fiber material. The hardening process thus gives a durably strong bond, inseparable by virtue of interlocking.

In a particularly advantageous embodiment, a coating applied as adhesion promoter on the internal side of the thermoplastic film comprises a coating which forms a durably strong bond with the component during the production process. Said coating can be applied to the film subsequently. However, particular preference is given to the coextrusion method, where the external side of the film (the subsequent surface) and the internal side of the film are produced by a shared extrusion process. The extrusion process uses thermoplastics which are melted in the extrusion head of an extruder and then, in liquid phase, are pressed together to give the desired type of film having two or else more sublayers. The plastics harden immediately after the pressing procedure. By virtue of suitable selection of materials for the plastics, these have then been bonded securely to one another chemically or via interlocking. Coextrusion is an advantageous production process here.

Adhesion promoter used preferably comprises a plastic selected from the group consisting of EVA (ethylene-vinyl acetate), PCB (polychlorinated biphenyls), APAO (amorphous poly-alpha-olefins), TPE-U (urethane-based thermoplastic elastomers), TPE-E (thermoplastic copolyesters), TPE-A (thermoplastic copolyamides), EVOH (ethylene-vinyl alcohol), and PE (polyethylene), or a combination thereof.

A suitable thermoplastic film preferably used is a plastic selected from the group consisting of PMMA (polymethyl methacrylate), PC (polycarbonate), SAN (styrene-acrylonitrile), PVF (polyvinyl fluoride), and PVC (polyvinyl chloride), or a combination thereof. It is also possible to select advantageous plastics such as PE (polyethylene) or PA (polyacetate), if by way of example the component is produced for an interior sector.

By virtue of the adhesion promoter, preferably coextruded with the thermoplastic film, it is possible, by heating, to achieve an interlock bond between the system and the fibers cast into the material. The adhesion promoter, as liquid phase, wets the uppermost fiber layer by way of example and therefore leads to a mechanical frictional bond by way of fibers cast into the material. The thermoplastic film has therefore been durably and inseparably bonded as surface to the fiber composite component.

It is also possible, of course, to select, for the thermoplastic film itself, a suitable plastic which enters into the durable bonding described to the component via adhesion during the production process. However, the provision of a separate adhesion promoter can decouple the adhesion function from the desired surface properties. This makes it possible to use, for the thermoplastic film, exclusively the material optimized for the desired surface properties. By way of example, a surface property such as acid resistance, aging resistance, weathering resistance, hardness, or a haptic property, or else coloring, etc., can be allocated separately to the outermost layer in the film composite.

If a further material is integrated into the film composite to promote adhesion, and differs from the material of the outer layer, further functions, alongside adhesion promotion, can preferably be provided thereto in a downstream heat-conditioning process, in order to improve surface properties.

In order to reduce cycle time and thus to reduce press occupancy, it is conventional by way of example in the RTM process to use a downstream step at controlled temperature to raise the degree of hardening of the thermoset or of the thermoset matrix. In this case, the resin system crosslinks only partially within the mold cavity, and crosslinks completely only during the heat-conditioning process.

In a preferred embodiment of the invention, a downstream heat-conditioning process is used to improve surface properties. To this end, the thermoplastic film made of a multi-material structure, for example with use of the adhesion promoter, is designed in such a way that the individual layers of material used in the film have different thermal property profiles which exhibit major differences in modulus of elasticity at a prescribed heat-conditioning temperature.

By virtue of the differences in the modulus of elasticity in the film structure, the stress reduction that occurs under controlled-temperature conditions can be allowed to have a specific effect. The underlying concept here is the law of nature according to which every object in the natural world seeks to reduce its energy level. One form of energy here is the stress that is introduced into materials and that seeks relaxation. It has been found possible to produce an even smoother film surface by this means.

During the period under controlled-temperature conditions, postcrosslinking of the thermoset or of the thermoset matrix takes place, and leads to volume shrinkage. Because the structure of the composite material is anisotropic, the fibers cause nonuniform distribution of shrinkage, and regions with an increased proportion of fiber can become undesirably apparent on the surface. In the regions of increased shrinkage (resin-rich regions), greater deformation of the film occurs, and increased stresses therefore arise therein, in particular by way of flexural and/or tensile stresses.

"Both" sublayers of the film are mechanically deformed by said shrinkage process. There is accordingly an increase in the mechanical stress level of the film composite, and this level varies locally, and seeks relaxation. A subsequent heat treatment can reduce this stress increase in the regions of deformation, i.e. in the regions where the fibers are apparent, or where there is an indentation or a surface depression, whereupon the film surface becomes smoother, with a reduction of the stress level. This occurs because the portion of the film oriented toward the inside softens more than the exterior portion. The interior portion of the film can thus replace the thermoset portion that has shrunk and thus compensate therefor. Furthermore, the exterior portion of the film has, in contrast, increased stiffness, and the proportion of stress located in that portion therefore decreases as a consequence of reduced tensile strain values by virtue of the smoothing process.

It is preferable that the softening point of the adhesion promoter, i.e. the portion of the film (of the film composite) that is oriented toward the interior, is lower than that of the exterior thermoplastic portion of the film. If, as is preferable, the subsequent heat treatment takes place at a temperature between the softening point of the adhesion-promoter film and of the exterior thermoplastic film, the modulus of elasticity of the adhesion promoter decreases because of softening. The exterior film, i.e. that portion of the film that is oriented outward, can relax with the desired smoothing process, with reduction of stress level.

As an alternative, or else in addition to an adhesion promoter, the internal side of the film can preferably also have graining, in order to produce durable bonding to the component. A grained internal side of the film provides adhesion via mechanical interlock on hardening of the component. After the hardening process, the depressions, grooves, pores, etc. of the grain form undercuts for the thermoset that has penetrated into the material, thus ensuring a durable, inseparable bond to the system.

Thermosets used, i.e. plastics which once they have hardened cannot undergo further deformation, are resin systems that cure at room temperature or else those that harden with heat. In particular, it is also possible to use self-curing resin systems made of a resin material and of a hardener. In particular, the following can have been used as matrix or as thermoset: an epoxy resin, a polyester resin, an ABS (acrylonitrile-butadiene-styrene) resin, an amino-plastic, or a vinyl, phenolic, or polyurethane resin.

In another advantageous embodiment, the preform is subjected to a specific treatment, where the film becomes plastically deformed to give a component surface that is in particular smooth. This can be achieved with exposure to mechanical, chemical, hydrodynamic, or preferably thermal effects. A combination of these is possible. Utilization of hydrodynamic effects in particular means suction to extract gases or fluids located between the still flat preform and the topography of the mold, for the purposes of shaping. This term can also mean targeted control of the pressure between the films, and also of the pressure in the closed cavity.

The film can also be rendered flexible by a chemical treatment. To this end, it is possible by way of example to swell the film with a suitable solvent which, on achievement of the final shape, is in turn lost by evaporation and thus renders the material hard.

The preferred heat treatment softens the thermoplastic film in such a way that this by way of example approximates the topography of the desired component in the cavity of a mold. Another optional result of the softening of the thermoplastic film is the durably strong bonding to the component. This is in particular the case when an adhesion promoter has been used on the internal side of the thermoplastic foil. It is also possible, of course, for a thermoplastic film produced in unitary manner to form an interlock with the component through the softening process and subsequent return to the solid phase. Another possibility here is chemical bonding to the binder system or resin system used.

When a resin system that cures at room temperature or that is self-curing is used as thermoset, or when the processing temperature of the film is not appropriate for the resin system, a separate heat treatment is optionally required in order to subject the thermoplastic film that sheaths the preform to a forming process to give the subsequent topography. This procedure is in particular advantageous when a rapidly curing low-temperature resin is used. It is then optionally necessary only to heat the external side of the preform in order to subject the film to a forming process. When a heat-curing thermoset is used, the adaptation of the shape of the thermoplastic film can in turn preferably take place simultaneously with the heat treatment for hardening the thermoset introduced.

It is advantageously intended that the thermoplastic film material does not enter into any liquid phase during the course of the heat treatment. Although, therefore, the film enters into a plastic state during the process of replicating the geometry of the mold, said state is not sufficient to make the fiber structure apparent. Because of this, and of precautions taken here relating to the process and to the mold, a smooth component surface is in turn obtained.

In a particularly preferred embodiment of the invention, the introduction of the thermoset into the internal space within the film, the forming process for the preform, and the hardening process take place in combination within a short period of time in a stamping step in a RTM process. The RTM process is what is known as a resin transfer molding process, where the hardening of the thermoset takes place in combination with an stamping step. By virtue of the sheathing provided here with the thermoplastic film, the forming process, the introduction of the thermoset, and the hardening process can take place in a combined operation within a short period of time in a mold. To this end, the still dry preform is inserted with sheathing by way of example into the cavity of the mold. The mold is then closed and subjected to pressure, and the preform together with sheathing is therefore converted to the desired component shape. In parallel with this, by way of example by means of external subatmospheric pressure or superatmospheric pressure, the liquid thermoset is introduced into the inserted molding. The thermoset saturates the fiber material here. The thermoset is then hardened by way of example by introducing heat for heat treatment of the combined materials, where the thermoplastic film also softens, and thus becomes durably bonded on the component, and at the same time is adapted to the surface geometry of the component.

The RTM process has significant advantages in terms of cost and logistics, because of the combined manufacturing steps.

It is preferable that the dry stack has been produced in essence in the form of a sheet. To this end, the fiber material can have been cut to size in accordance with the desired fundamental shape or projection shape. The preform in the form of a sheet is then subjected to a forming process to give the final component by using a mold corresponding to the desired three-dimensional topography. In particular, material in the form of a sheet is useful for sheet-like components with a three-dimensional shape. This type of shape is by way of example a feature of many visible components in the automobile industry, examples being cladding, bumpers, etc.

A film tube can advantageously be used for the sheathing of the dry fiber stack. Once the film tube has sheathed the stack, its ends are by way of example welded, adhesively bonded, or sealed in any other manner, so as to be gastight. In the case of a stack in the form of a sheet, another possibility, in another preferred embodiment, is in particular to provide two film webs which, in a throughflow process, are brought into contact with the two sides of the flat stack, and are welded or adhesive-bonded around the periphery. Either the enclosure within a tube or the insertion between two or more film webs can be designed, in terms of manufacturing technology, as a continuous or semi-continuous throughflow process.

Fibers used can comprise glass fibers, carbon fibers, natural fibers, thermoplastic fibers, and/or aramid fibers. The subsequent characteristic properties of the desired fiber composite component can thus be taken into account. The fiber material itself is preferably of textile type, where the fibers have been bonded to one another to give a woven fiber fabric, a knitted fiber fabric, and/or a nonwoven fiber fabric. Another possible alternative is the use of a fiber paper. The latter differs from a nonwoven fiber fabric, where fibers have been bonded to one another in an unordered manner for example by needling, in the finer structure of the fibers and the interior surface produced by pressing.

In a more embodiment, projecting material is removed thermomechanically, i.e. by a thermal-mechanical combination, during the forming process and/or during the hardening process. By way of example, the removal process takes place within the mold by heating of the edges of the mold. This firstly subjects the projecting film material to a welding process of the type that would result from welding lips. Secondly, projecting film material that is not required is simultaneously removed from the component.

Components made of a fiber composite material have hitherto been overdimensioned at the production stage, for manufacturing reasons. After the hardening process, projecting edges are removed mechanically, for example by grinding, milling, or cutting. However, when projecting material is removed thermomechanically in the present process during the hardening process or the forming process, it is possible to reduce not only materials costs but also production costs. By virtue of the additional welding of the film edges, the entire component can be manufactured with smaller dimensions. The reduction in the amount of projecting material considerably reduces the costs for downstream mechanical operations.

Another major advantage of the process provided here is that the component made of the fiber composite material can be joined thermally with further components without difficulty by way of the thermoplastic film. In particular, the film can be joined with a further component either by means of welding or by means of soldering. In the welding process, the two components are heated locally or over an area to a temperature above the softening point. During this process, the materials penetrate into one another. When plastics are joined, a boundary region can form in which the polymers bond by forming a region of diffusion. The welding process is therefore particularly suitable for joining the abovementioned component, after its production, with a further component made of plastic. In the soldering process, only one component is heated above the softening point. The process of joining the other component then takes place through adhesion and physical or mechanical bonding. Soldering can therefore join the abovementioned component, after its production, by way of example to a further component made of metal. A component produced as described above accordingly has the major advantage that it can be joined with other components without any adhesive process.

An embodiment of the invention further achieves the object mentioned in the introduction via a component made of a fiber composite material and produced by the process described above. A component of this type comprises, bonded within a matrix made of a thermoset, a number of sublayers of a fiber material, and also comprises a surface layer made of a thermoplastic bonded directly to the system.

It is preferable that the surface layer here has been bonded to the system by adhesion as described. In a particularly preferred embodiment, the surface layer has been bonded to the system by way of an adhesion promoter.

Other advantageous embodiments of the component can be based on principles corresponding to those for the embodiments relating to the production process. These accordingly give advantages transferred to the component.

An embodiment of the invention also achieves the object mentioned via a preform for a component made of a fiber composite material, in particular as obtained after a number of partial steps as in the process described above. This type of preform comprises a stack made of a number of sublayers of a dry fiber material, which has been sheathed in a gastight manner with a thermoplastic film, where a subatmospheric pressure prevails in the internal space occupied by the stack in the film, and the sublayers have thus been secured so as to be stable during transport.

This type of preform obtains its stability during transport through the mechanical properties of the thermoplastic film. The sublayers have been compressed by virtue of the subatmospheric pressure prevailing. Because the sheathing film is elastic, it inhibits any deformation. The preform is stable during transport. The sheathing secures the sublayers in a dimensionally stable manner. The preform is moreover more resistant to aging, since no hardenable resin content is present. It is preferable that the sublayers have been mutually superposed in an unsecured manner. In an advantageous embodiment, the sublayers have been stacked to give a drapable stack, and the sublayers can have been locally secured to one another here. The selection of the position and nature of securing is such as to provide continued retention of drapability, and is in accordance with the subsequent geometry of the component.

In an advantageous embodiment, the dry stack is in essence in the form of a sheet. It is preferable that a stack of this type in the form of a sheet has been inserted in a gastight manner between film webs.

Other advantageous embodiments are obtained by transferring principles corresponding to those for the embodiments described for the production process. The advantages can be transferred here by using corresponding principles.

BRIEF DESCRIPTION OF THE DRAWINGS

Embodiments of the invention have been explained in more detail with reference to a drawing.

DETAILED DESCRIPTION

Figure 1:
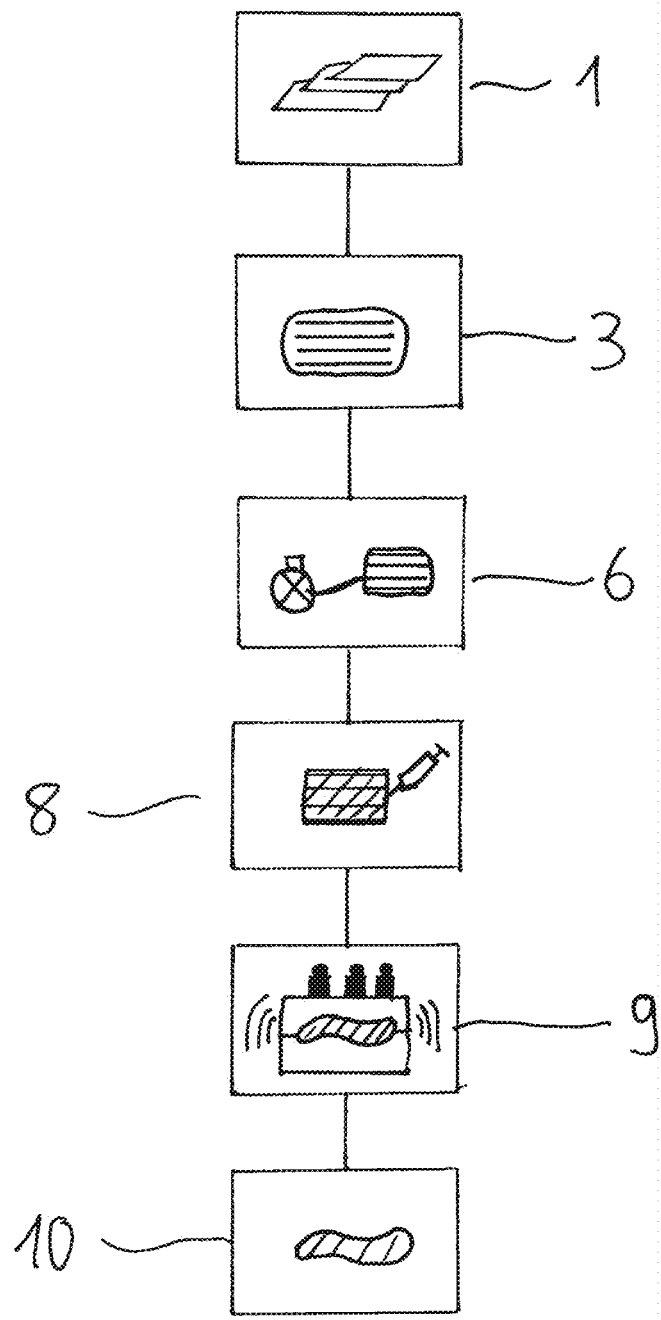
FIG. 1 here is a diagram of the sequence for producing a fiber composite component provided with a high-quality surface, and FIG. 2 here is a diagram of the production of a fiber composite component provided with a high-quality surface by the RTM process.

FIG. 1 is a diagram of the production of a component provided with a high-quality surface and made of a fiber composite material. A fiber material in the form of a sheet, an example being a woven fiber fabric textile, is appropriately cut to size, and then a plurality of these fiber sheets are first stacked on top of one another in an unsecured manner as in image 1. It is also possible here to undertake a securing process, locally or sectionally, for example by needling, but drapability is retained here. The unsecured or in essence unsecured (because locally secured) and dry fiber stack is drapable in relation to the final geometry. A thermoplastic film is then used to sheath the fiber stack as in image 3. The film here by way of example takes the form of a tube and is gently brought into contact with the stack, or the stack is inserted into the film tube. The ends of the tube are welded or adhesive-bonded to one another, in such a way that a gastight sheath has been formed. The thermoplastic film used is by way of example produced as a film composite by coextrusion. In particular, an aging-resistant plastic that is impermeable to water and resistant to acid has been used on the external side of the film. An adhesion promoter has been applied on the internal side.

The gastight internal space within the film is then subjected to suction from a pump as in image 6. During this process, the fiber-material stack, which is unsecured, or at most locally secured with retention of drapability, and dry, is compressed and thus dimensionally stabilized. The exterior film sheaths the stack and also provides mechanical strength, and protection from exterior influences resulting from soiling, moisture, etc. The resultant preform as in image 6 is dimensionally stable and transportable. The creation of the fiber stack required for the composite material can thus be decoupled from the subsequent shaping by a mold. The residence time in the mold has thus been reduced, thus giving an optimized and less expensive production process.

A liquid thermoset is introduced into the preform as in image 8, and by way of example hardens on exposure to heat. An injection process has been indicated symbolically here, i.e. pressure is used to inject the liquid phase of the thermoset into the internal space. Uniform saturation of the fiber material with the thermoset takes place by virtue of the subatmospheric pressure in the internal space of the preform.

The saturated preform is subjected to a forming process as in image 9. For this, it is by way of example inserted into the cavity of a mold. The preform, together with sheathing provided by the thermoplastic film, is subjected to a forming process under pressure to give the finished component. Heat is simultaneously introduced here, whereupon the thermoplastic film approximates the exterior geometry of the cavity, and the thermoset hardens.

The hardening process in particular and by way of example causes frictional bonding of the thermoplastic film to the fiber material. The adhesion promoter applied on the internal side of the film softens by virtue of the temperature increase and penetrates into the upper fibers of the fiber material. This bonding, and the embedding of the fibers into the resin system as it hardens, creates a durably strong and inseparable bond of the thermoplastic film, as surface, to the component.

The finished component produced from a fiber composite material is then obtained after demolding, as in image 10. Said component has been provided with a high-quality surface. Its surface properties are principally achieved by virtue of the sheathing of the thermoplastic film. There is no need for post-treatment through any additional process step. The component has the desired haptic properties, the desired surface structure, and the desired physical and/or chemical surface properties. In particular, it is also possible to control the color of the component advantageously by way of the thermoplastic film.

Figure 2:
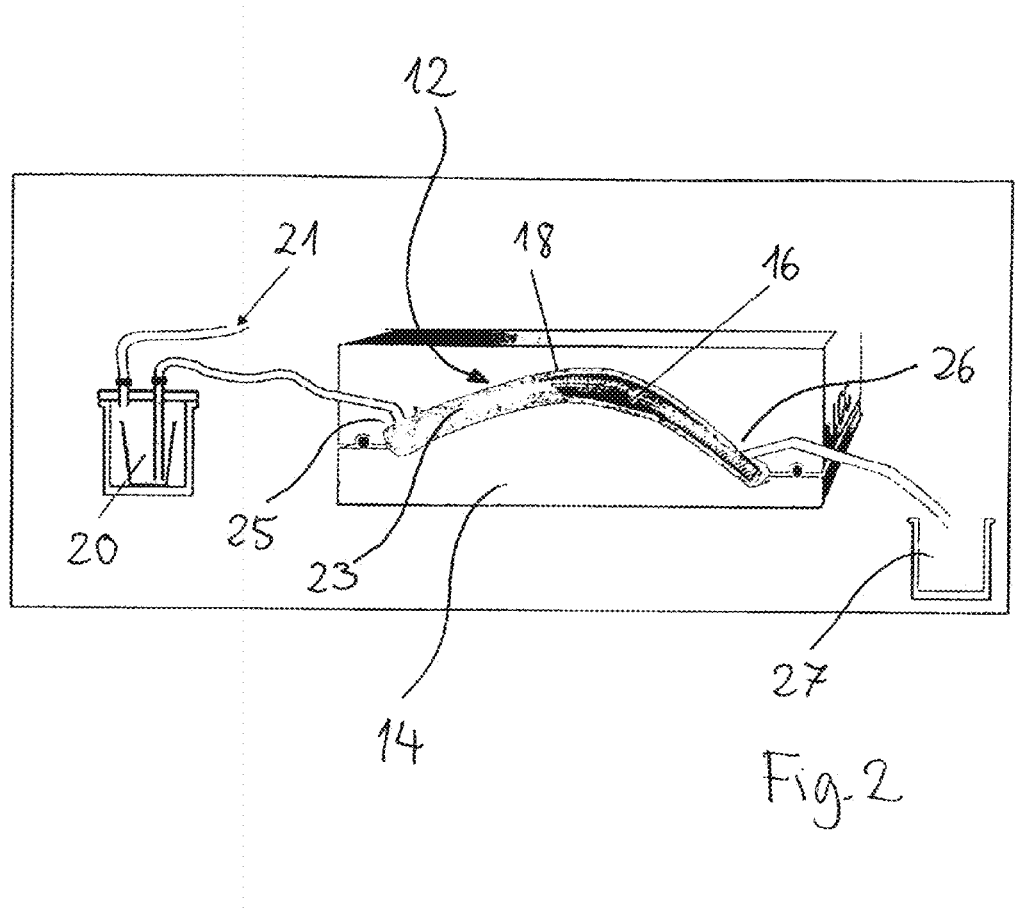

FIG. 2 is a diagram of what is known as the RTM process (resin transfer molding process) for producing the component made of a fiber composite material. A dry preform 12, sheathed by film and stable during transport, is inserted here into a cavity between the two portions of a stamping press 14. The stamping press is then closed, whereupon the preform 12 is subjected to a forming process to give the topography of the desired component. The preform 12 here has not yet been saturated with a thermoset. From the preform 12 it is possible to discern a dry fiber stack 16 in the interior, and also the sheathing thermoplastic film 18 on the external side.

After the stamping press 14 has been closed, with the forming process, a liquid thermoset 20 is introduced under pressure into the internal space within the film in the preform 12. To this end, by way of example compressed air 21 has been provided.

The pressurized thermoset 20 flows by way of an appropriate input aperture 25 in the preform 12 into the internal space thereof, and gradually and uniformly saturates the dry fiber stack 16. At the other end of the preform 12, excess thermoset is discharged by way of a discharge aperture 26 into a receiver 27.

Once the preform 12 has been saturated, the cavity of the stamping press 14 is heated, and the thermoset 20 introduced is thus hardened. However, the temperature of the cavity can also have been precontrolled in advance. The thermoplastic film 18 has by way of example been provided with graining on the internal side, for bonding as surface to the system. The thermoset 20 that has penetrated in the form of liquid phase into pores, apertures, and valleys in the film 18 hardens. Undercuts are thus formed with the thermoplastic film 18. The thermoplastic film 18 has been durably interlock-bonded to the finished component.

The finished component is then removed from the stamping press 14. The desired surface properties of the fiber composite component have been established by way of the thermoplastic film 18 bonded with durable strength to the system.

KEY

1 Unsecured stacking
3 Sheathing with thermoplastic
6 Internal space subjected to suction from a pump
8 Saturation with thermoset
9 Forming process/hardening process
10 Removal of sheathed component
12 Preform
14 Stamping press
16 Dry fiber stack
18 Thermoplastic film
20 Thermoset
21 Compressed air
23 Internal space
25 Input aperture
26 Discharge aperture
27 Receiver

What is claimed is:

1. A process for producing a component made of a fiber composite material wherein:
    (a) a number of sublayers of a dry fiber material are stacked to give a dry stack having no binder material,
    (b) the dry stack is placed within a thermoplastic film which is used for gastight sheathing of the dry stack,
    (c) an internal space occupied by the dry stack within the film is subjected to suction from a pump, the sublayers being secured to form a drapable stack that allows slipping or shearing of the fibers within the fiber material to produce a preform that is stable during transport,
    (d) the preform is subjected to a forming process,
    (e) a liquid thermoset is introduced into the internal space, resulting in saturation of the fiber material, and
    (f) the preform with saturated fiber material is hardened to produce the component, with durable bonding of the film forming a surface of the component.

2. The process as claimed in claim 1, wherein the liquid thermoset is introduced using a pressure difference.

3. The process as claimed in claim 1, wherein the film enters into durably strong, inseparable bonding within the component during the hardening process.

4. The process as claimed in claim 1, wherein an adhesion promoter is used to promote coherent bonding of the film within the component.

5. The process as claimed in claim 4, wherein a coating is applied by coextrusion as the adhesion promoter on an internal side of the film.

6. The process as claimed in claim 5, wherein the adhesion promoter comprises a plastic selected from the group consisting of EVA, PCB, APAO, TPE-U, TPE-E, TPE-A, EVOH, and PE, or a combination of two or more thereof.

7. The process as claimed in claim 1, wherein the internal side of the film is provided with graining in order to produce a durable bond within the component.

8. The process as claimed in claim 1, wherein, in step (d), the preform is subjected to thermoplastic deformation of the film to produce a smooth component surface.

9. The process as claimed in claim 8, wherein the thermoplastic deformation of the film, the introduction of the liquid thermoset, and the hardening of the preform with the saturated fiber material are performed together within a mold with both heat and pressure being applied to the preform.

10. The process as claimed in claim 1, wherein the dry stack is produced as a sheet.

11. The process as claimed in claim 1, wherein introduction of the thermoset, the forming process, and the hardening process take place in combination in a stamping step in a resin transfer molding process.

12. The process as claimed in claim 1, wherein the sublayers of the fiber material comprise one or more of a woven fiber fabric, a knitted fiber fabric, a fiber paper, and a nonwoven fiber fabric.

13. The process as claimed in claim 1, wherein fibers in the fiber material comprise one or more of glass fibers, carbon fibers, natural fibers, thermoplastic fibers, and aramid fibers.

14. The process as claimed in claim 1, wherein the film comprises a plastic selected from the group consisting of PMMA, PC, SAN, ASA, PVF, and PVC, or a combination of two or more thereof.

15. The process as claimed in claim 1, wherein, during one or more of the forming process and the hardening process, projecting material is removed thermomechanically.

16. The process as claimed in claim 1, wherein, by way of the thermoplastic film, in a further processing step, the component is joined thermally with another component.

17. The process as claimed in claim 1, wherein:

in step (b), the dry stack of the sublayers of the dry fiber material is placed into a gastight bag formed of the thermoplastic material;

in step (c), the internal space occupied by the dry stack within the gastight bag is subjected to the suction from the pump via an opening in the gastight bag, the sublayers being secured within the evacuated gastight bag to produce the preform; and in step (e), the liquid thermoset is introduced into the internal space of the preform, resulting in the saturation of the fiber material.

18. The process as claimed in claim 1, wherein:

the preform that is stable during transport is produced at a first location;

the preform is subjected to the forming process at a second location remote from the first location; and after producing the preform that is stable during transport, but before the preform is subjected to the forming process, the preform is transported from the first location to the second location.

19. A process for producing a component made of a fiber composite material wherein:

(a) a number of sublayers of a dry fiber material are stacked to give a dry stack having no binder material, (b) the dry stack is placed within a thermoplastic film which is used for gastight sheathing of the dry stack, (c) an internal space occupied by the dry stack within the film is subjected to suction from a pump, the sublayers being secured to produce a preform that is stable during transport, (d) the preform is subjected to a forming process, (e) a liquid thermoset is introduced into the internal space, resulting in saturation of the fiber material, and (f) the preform with saturated fiber material is hardened to produce the component, with durable bonding of the film forming a surface of the component, wherein, by way of the thermoplastic film, in a further processing step, the component is joined thermally with another component.

* * * * *